United States Patent [19]

Friedman

[11] 4,448,686

[45] May 15, 1984

[54] FILTER BAG WITH INTEGRAL AGITATOR

[75] Inventor: Bernard Friedman, Allentown, Pa.

[73] Assignee: Oil Process Systems, Inc., Allentown, Pa.

[21] Appl. No.: 439,194

[22] Filed: Nov. 4, 1982

[51] Int. Cl.³ .................. B01D 33/00; B01D 35/00
[52] U.S. Cl. ................................ 210/238; 210/383; 210/470
[58] Field of Search ............ 210/237, 238, 356, 383, 210/391, 407, 413, 470, 471, 473, 474, 477, 481, 514, 516, 517; 55/365, 368, 370, 376, 381

[56] References Cited

U.S. PATENT DOCUMENTS

| 1,003,410 | 9/1911 | Arnesen | 210/470 |
| 1,073,081 | 9/1913 | Jacobsen | 210/470 |
| 2,055,394 | 9/1936 | Thomas | 210/413 |
| 4,207,631 | 6/1980 | Baggey | 210/238 |

Primary Examiner—Charles N. Hart
Assistant Examiner—Wanda L. Millard
Attorney, Agent, or Firm—Lerner, David, Littenberg, Krumholz & Mentlik

[57] ABSTRACT

A filter bag is provided with an integral flap for agitating a liquid which is being filtered to thereby inhibit particulate matter from collecting on the filter bag and clogging it during a filtering operation.

12 Claims, 4 Drawing Figures

FILTER BAG WITH INTEGRAL AGITATOR

FIELD OF THE INVENTION

The present invention relates to a filter bag for cooking oil, and, more particularly, to such a bag which inhibits clogging due to the accumulation of food crumbs and other particulate matter.

BACKGROUND OF THE INVENTION

In my U.S. Pat. No. 4,052,319, there is disclosed a filter bag for cooking oil. The bag includes an independent stirrer adapted to remove sludge (i.e., accumulated food crumbs and other particulate matter) from the filter surface during a filtering operation. The stirrer is formed from a single rod bent so as to provide a generally U-shaped stirring portion and a handle portion.

The filter bag and stirrer disclosed in my U.S. Pat. No. 4,052,319 have been marketed successfully for many years. Despite their commercial success, the filter bag and stirrer have room for improvement. For instance, because the filter bag and stirrer are separate and distinct items, their shipping, storage and handling are complicated. As a result of its construction, the stirrer itself is also relatively expensive to manufacture. In use, the stirrer will oftentimes contact the filter bag, causing the larger particulate matter collected on the bag to cut or abrade it while causing the smaller particulate matter to be forced into the pores of the bag to completely plug them.

SUMMARY OF THE INVENTION

Many of the problems and shortcomings of the filter bag and stirrer described above are overcome by the present invention. More particularly, the present invention relates to a new and improved filter bag which is provided with an integral agitator positioned inside the bag. By automatically or manually operating the agitator, a liquid which is being filtered, such as hot used cooking oil, can be agitated gently yet to an extent sufficient to create waves which wash food crumbs and other particulate matter from the inner surface of the filter bag, thereby inhibiting clogging of the bag during a filtering operation. The less the filter bag is clogged, the better and faster the filtering operation.

In one embodiment, the agitator is a flexible flap sewn into a central seam extending along the bottom of the filter bag. The flap, which can be made from a porous material or non-porous material, has a free end which extends above the top of the filter bag. By moving the free end of the flap up and down, either manually by an individual or automatically by an external mechanical device, the bottom of the bag can also be moved up and down, thereby agitating the liquid in the manner described above so as to inhibit clogging of the filter by food crumbs and other particulate matter which would otherwise collect on the inner surface of the bag. In addition to functioning as an agitator, the flap can be utilized to lift the bottom of the bag off of the bottom of the receptacle for the filtered liquid or out of the filtered liquid itself, so that the total surface area of the filter can be used for filtering purposes to thereby further enhance the filtering operation.

In an alternate embodiment, the flap is replaced by a string attached to the bottom of the filter bag. This alternate embodiment is especially useful in pressurized filtering systems, as well as in gravity flow systems.

BRIEF DESCRIPTION OF THE DRAWINGS

For a more complete understanding of the present invention, reference may be had to the following description of three exemplary embodiments considered in conjunction with the accompanying drawings, in which.

DESCRIPTION OF THE EXEMPLARY EMBODIMENTS

Figure 1:
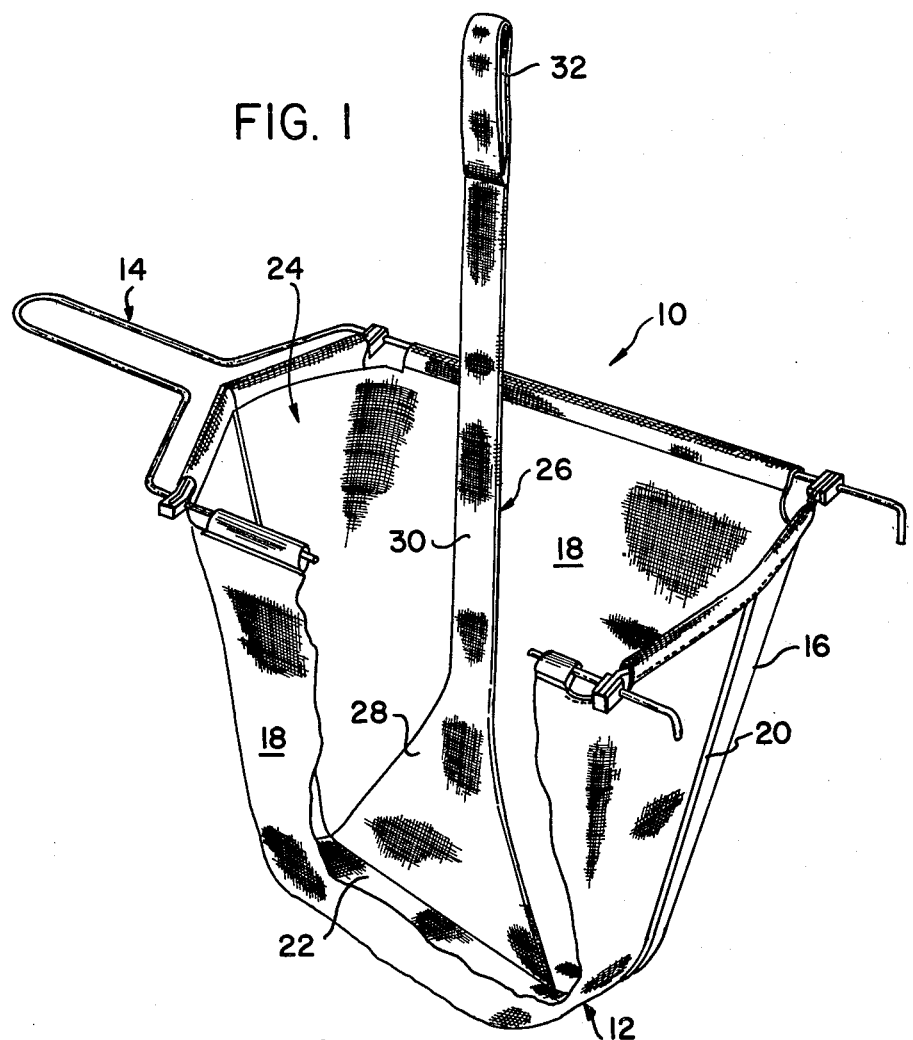
FIG. 1 is a perspective view of a first exemplary embodiment of a filter bag assembly constructed in accordance with the present invention, a portion of the filter bag assembly being broken away to facilitate consideration and discussion.

Referring initially to FIG. 1, there is shown a filter bag assembly 10 including a filter bag 12 suspended from a support structure 14. Inasmuch as the support structure 14 is fully and completely described in my U.S. Pat. No. 4,052,319, a further description of the support structure 14 will not be recited herein. However, the specification of U.S. Pat. No. 4,052,319 is incorporated herein by reference. Also, it should be understood that the filter bag 12 may be used in combination with other support systems. For instance, the filter bag 12 may simply be draped over the rim of a container.

Turning now to a further description of the filter bag 12, it includes a body 16 made from two identical panels 18 which are joined together along a central seam 20 of the filter bag 12 so as to form a closed bottom 22 and an open top 24. The panels 18 are made from a smooth surfaced material, such as Mylar or polytetrafluoroethylene, which can withstand the elevated temperatures encountered in the filtration of hot cooking oil (i.e., temperatures generally in a range of from about 325° F. to about 375° F.) and which has a uniform pore size in a range of from about 40 microns and to about 60 microns and an open area in a range of from about 20% to about 30% of the total area.

A flexible flap 26 is attached directly to the central seam 20 of the filter bag 12 along the bottom 22 thereof. The flap 26 includes a triangularly-shaped head 28 located within the body 16 of the filter bag 12 and a tail 30, which extends upwardly from the head 28 to a handle 32 located above the top 24 of the filter bag 12. The flap 26 is made from a non-porous material, such as Mylar. Alternatively, the flap 26 can be perforated or it can simply be made, either completely or partially, from a porous material.

During a filtering operation as used cooking oil is poured into the filter bag 12 and allowed to flow by gravity outwardly through the panels 18 thereof, the handle 32 of the flap 26 can be manually moved up and down. Such movement of the flap 26 causes a corresponding movement of the bottom 22 of the filter bag 12, resulting in the gentle agitation of the cooking oil being filtered through the panels 18. Such agitation of the cooking oil creates waves which wash away food crumbs and other particulate matter collected on the inner surfaces of the panels 18 to inhibit clogging and therefore reduce filtering time. In addition, as a result of the improved filtration effectiveness, the useful life of the cooking oil can be extended and the quality of the food cooked in the filtered oil can be improved.

In certain instances, the effective filtering area of the filter bag 12 is reduced because the bottom 22 of the filter bag 12 contacts the bottom of a receptacle for the filtered cooking oil or rests in the filtered cooking oil itself. In order to avoid the resulting diminished effectiveness of the filter bag 12 in such instances, the flap 26 can be raised to thereby raise the bottom 22 of the filter bag 12 off of the bottom of the receptacle or out of the filtered liquid.

Figure 2:
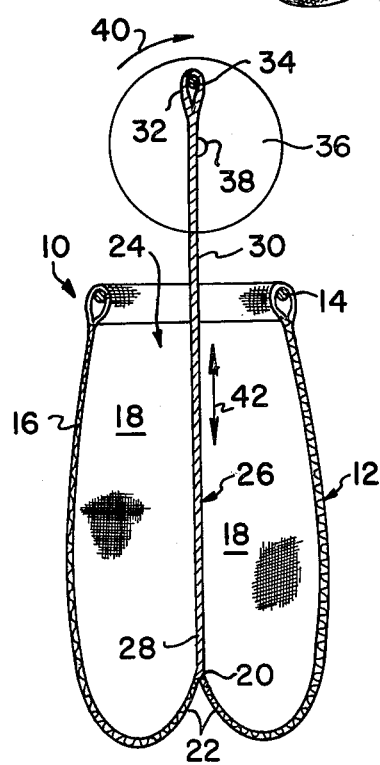
FIG. 2 is a lateral cross-sectional view of the filter bag assembly illustrated in FIG. 1, the filter bag assembly being actuated to an external mechanical device for automatic operation.

The flap 26 can also be moved up and down automatically. For instance, as shown in FIG. 2, the handle 32 of the flap 26 can be attached to a pin 34 mounted eccentrically on a rotatable disc 36. The disc 36 is attached to an output shaft 38 of an electric motor for rotation therewith. By such an arrangement, rotation of the output shaft in a direction indicated by arrow 40 will result in the reciprocating movement of the flap 26 in a generally vertical direction as indicated by double-headed arrow 42. A slight side-to-side movement of the flap 26 will also be produced. As a result of the reciprocating movement of the flap 26, the bottom 22 of the filter bag 12 is raised (see FIG. 2) and lowered (see FIG. 1) to effect the desired agitation of the cooking oil which is being filtered.

Figure 3:
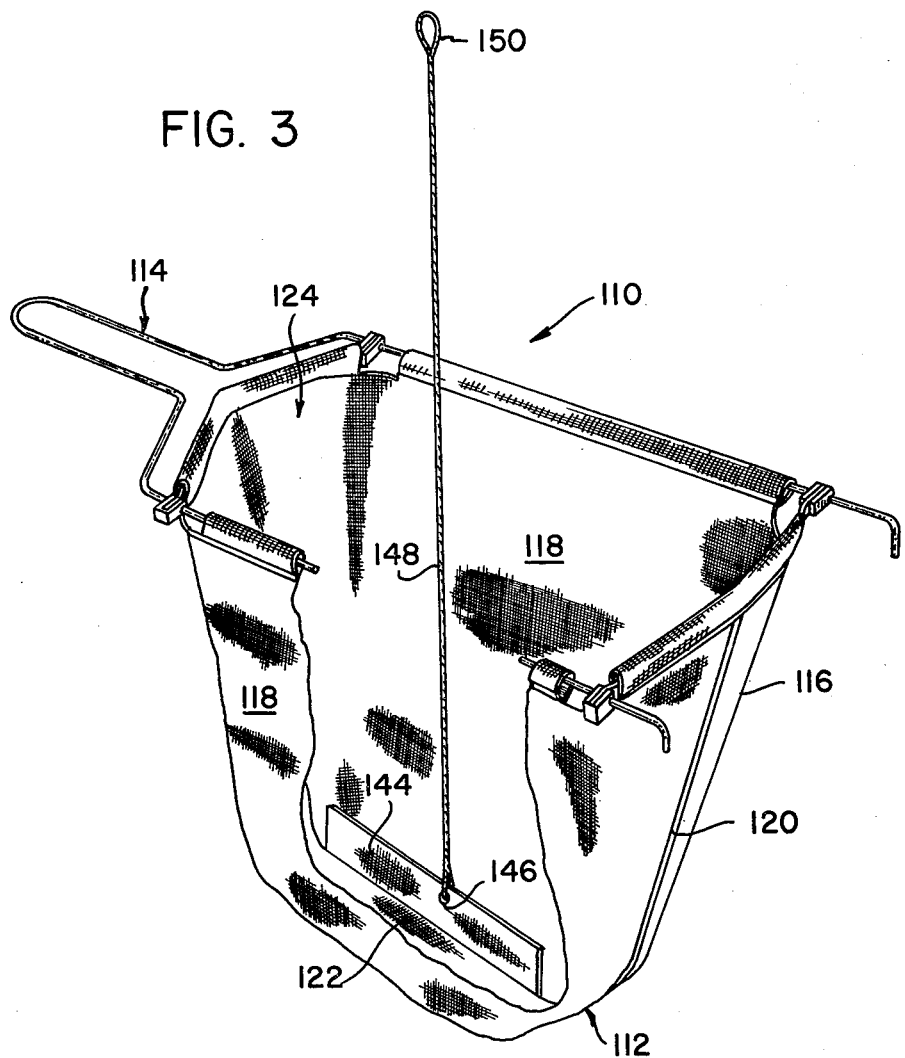
FIG. 3 is a perspective view of a second exemplary embodiment of a filter bag assembly constructed in accordance with the present invention, a portion of the filter bag assembly being broken away to facilitate consideration and discussion.
Figure 4:
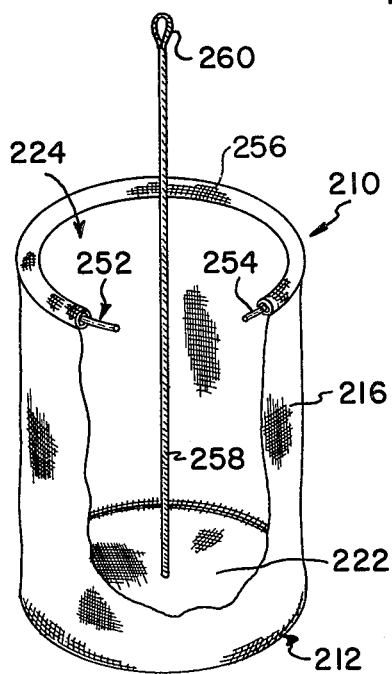
FIG. 4 is a perspective view of a third exemplary embodiment of a filter bag assembly constructed in accordance with the present invention, a portion of the filter bag assembly being broken away to facilitate consideration and discussion.

Other exemplary embodiments of filter bag assemblies constructed in accordance with the present invention are illustrated in FIGS. 3 and 4. The various elements illustrated in FIGS. 3 and 4 which correspond to the elements described above with respect to the embodiment of FIGS. 1 and 2 have been designated by corresponding reference numerals increased by one hundred and two hundred, respectively. Unless otherwise stated, the embodiments of FIGS. 3 and 4 operate in the same manner as the embodiment of FIGS. 1 and 2.

Referring to FIG. 3, a filter bag assembly 110 includes a filter bag 112 and a support structure 114. The filter bag 112 has a body 116 made from two identical panels 118 which are joined together along a central seam 120 of the filter bag 112 so as form a closed bottom 122 and an open top 124. A rigid or semi-rigid stiffener 114 is attached directly to the central seam 120 of the filter bag 112 along the bottom 122 thereof. The stiffener 144 has a centrally located hole 146 sized and shaped to receive one end of a string 148. An opposite end of the string 148 is in the form of a loop 150 adapted to function as a handle.

With reference now to FIG. 4, a filter bag assembly 210 includes a filter bag 212 and a support structure 252, which includes a ring 254 received within an annular sleeve 256 circling an open top 224 of the filter bag 212. The filter bag 212 includes a cylindrical body 216 which has a closed bottom 222. One end of a string 258 is attached to the bottom 222 of the filter bag 212. An opposite end of the string 258 is in the form of a loop 260 adapted to function as a handle.

The filter bag assembly 210 is especially useful is pressurized filtering systems in which the liquid to be filtered is forced through the filter bag 212 under pressure. In such pressurized filtering systems, the agitation of the liquid being filtered resulting from the up and down movement of the bottom 222 of the filter bag 212 does not wash the filtrate off of the inner surface of the filter bag 212 but rather causes particulate matter lodged in the pores of the filter bag 212 to be spit out or otherwise ejected from the pores.

It will be understood that the embodiments described herein are merely exemplary and that a person skilled in the art may make many variations and modifications without departing from the spirit and scope of the invention. For instance, although the filter bag 12 is generally V-shaped in lateral cross section, other shapes can be employed. All such modifications and variations are intended to be inclined within the scope of the invention as defined in the appended claims.

I claim:

1. A filter bag, comprising a porous flexible body having a closed end and an open end, agitating means positioned within said filter bag and formed integrally therewith for agitating liquid being filtered by said filter bag, and attaching means for attaching said agitating means directly to said closed end of said filter bag such that the movement of said agitating means causes a corresponding movement of said closed end of said filter bag body, whereby said agitating means inhibits particular matter collected within said filter bag during a filtering operation from clogging said filter bag.

2. A filter bag according to claim 1, wherein said agitating means is a flexible flap.

3. A filter bag according to claim 2, wherein said flap is non-porous.

4. A filter bag according to claim 2, wherein said flap is manually movable towards and away from said open end of said filter bag body.

5. A filter bag according to claim 2, wherein said flap is automatically movable towards and away from said open end of said filter bag body.

6. A filter bag according to claim 2, wherein at least a portion of said flap is porous.

7. A filter bag according to claim 2, wherein said flap is perforated.

8. A filter bag according to claim 1, wherein said agitating means including a stiffener attached directly to said closed end of said filter bag and moving means for moving said stiffener towards and away from said open end of said filter bag body.

9. A filter bag according to claim 8, wherein said moving means is a string.

10. A filter bag according to claim 1, wherein said agitating means is a string.

11. A filter bag according to claim 1, wherein said filter bag is adapted for use in a gravity flow filtering system.

12. A filter bag according to claim 1, wherein said filter bag is adapted for use in a pressurized filtering system.

* * * * *

UNITED STATES PATENT AND TRADEMARK OFFICE
CERTIFICATE OF CORRECTION

PATENT NO. : 4,448,686
DATED : May 15, 1984
INVENTOR(S) : BERNARD FRIEDMAN

It is certified that error appears in the above-identified patent and that said Letters Patent are hereby corrected as shown below:

Column 2, line 15, "actuated" should read --attached--;
Column 4, line 10, "surface" should read --surfaces--;
Column 4, line 21, "inclined" should read --included--;
Column 4, line 50, "including" should read --includes--.

Signed and Sealed this

Twenty-ninth Day of January 1985

[SEAL]

Attest:

DONALD J. QUIGG

Attesting Officer      Acting Commissioner of Patents and Trademarks